(12) United States Patent
Schüssler et al.

(10) Patent No.: US 9,334,913 B2
(45) Date of Patent: May 10, 2016

(54) BEARING ARRANGEMENT FOR A SPRING OF A VEHICLE CHASSIS

(75) Inventors: Daniel Schüssler, Krombach (DE); Dieter Lechner, Düsseldorf (DE)

(73) Assignee: Thyssenkrupp Federn und Stabilisatoren GmbH, Hagen (DE)

( * ) Notice: Subject to any disclaimer, the term of this patent is extended or adjusted under 35 U.S.C. 154(b) by 53 days.

(21) Appl. No.: 14/111,814

(22) PCT Filed: Jan. 30, 2012

(86) PCT No.: PCT/EP2012/051459
§ 371 (c)(1),
(2), (4) Date: Nov. 27, 2013

(87) PCT Pub. No.: WO2012/139782
PCT Pub. Date: Oct. 18, 2012

(65) Prior Publication Data
US 2014/0225319 A1 Aug. 14, 2014

(30) Foreign Application Priority Data
Apr. 14, 2011 (DE) .......... 10 2011 002 065

(51) Int. Cl.
*F16F 1/06* (2006.01)
*F16F 1/12* (2006.01)
*B60G 11/14* (2006.01)
*B60G 15/06* (2006.01)

(52) U.S. Cl.
CPC .............. *F16F 1/126* (2013.01); *B60G 11/14* (2013.01); *B60G 15/062* (2013.01);
(Continued)

(58) Field of Classification Search
CPC .. B60G 2200/144; B60G 11/14; B60G 11/27; B60G 2202/152; B60G 2204/124; B60G 15/062; B60G 2204/1242; B60G 2206/73; B60G 2206/821; B60G 2206/91; F16F 1/00; F16F 2222/00; F16F 2224/00; F16F 1/26; Y10T 156/10
USPC .......... 267/179, 33, 105, 166, 167, 169, 170, 267/178, 286, 287
See application file for complete search history.

(56) References Cited

U.S. PATENT DOCUMENTS

| 3,141,660 A | 7/1964 | Clarke et al. |
| 4,162,064 A | 7/1979 | Bouton et al. |

(Continued)

FOREIGN PATENT DOCUMENTS

| DE | 2805223 A1 | 8/1978 |
| DE | 10297691 T5 | 6/2005 |

(Continued)

OTHER PUBLICATIONS

English translation of DE 102007003782 obtained Jul. 22, 2015 from http://worldwide.espacenet.com.*

*Primary Examiner* — Pamela Rodriguez
(74) *Attorney, Agent, or Firm* — Laurence A. Greenberg; Werner H. Stemer; Ralph E. Locher

(57) ABSTRACT

A bearing arrangement and a method for forming a bearing arrangement for a spring, in particular for a spring of a vehicle chassis, having at least one spring insert in which at least part of a spring coil of the spring is accommodated. The spring insert is an elastomer and is flexible. The spring insert is configured to be movable with a moving of the spring coil. An adhesive is introduced between the spring and the spring insert, with the result that the connection of the spring insert to the spring has a bonded connection.

16 Claims, 3 Drawing Sheets

(52) U.S. Cl.
CPC .... *B60G 2204/1242* (2013.01); *B60G 2206/73* (2013.01); *B60G 2206/821* (2013.01); *B60G 2206/91* (2013.01); *Y10T 156/10* (2015.01)

(56) References Cited

U.S. PATENT DOCUMENTS 7,213,802 B2  5/2007  Soga et al.
2011/0233836 A1*  9/2011  Sawai .......................... 267/166

FOREIGN PATENT DOCUMENTS

| | | |
|---|---|---|
| DE | 202006019979 U1 | 8/2007 |
| DE | 102007003782 A1 | 7/2008 |
| DE | 102008046939 A1 | 5/2009 |
| EP | 0791491 A1 | 8/1997 |

* cited by examiner

BEARING ARRANGEMENT FOR A SPRING OF A VEHICLE CHASSIS

BACKGROUND OF THE INVENTION

Field of the Invention

The present invention relates to a bearing arrangement for a spring, in particular for a spring of a vehicle chassis. The bearing arrangement has at least one spring insert in which at least part of a spring coil of the spring is accommodated. The spring insert comprises an elastomer and is designed to be flexible, whereas the spring insert is configured to be movable with a moving of the spring coil.

For receiving a spring, in particular within a vehicle chassis, mostly spring plates serve, and the spring is supported with at least a part of an end-side spring coil in the spring plate. To prevent the designed metal spring from coming into direct contact with a metal spring plate or other metallic features that provide needed support, spring inserts are known, that can receive the end-side spring coil on both the first and second end of the spring. The spring insert can be supported in a spring plate with a spring insert arranged on the bottom end of the spring.

Elastomers are suitable materials for forming spring inserts, so that the spring end is seated in a soft and resilient material.

During operation, the spring engages in a movement relative to the spring plate and the spring insert, which results specifically from a rolling movement of the spring coil that is seated on the spring insert.

By the resulting rolling movement of the spring end between the spring plate and the rolling spring coil, an opening and closing gap can occur. Despite the elastically and resiliently designed spring insert, the strong influence of dirt and moisture can have a grinding effect on the surface of the spring coil, and can cause damage to the spring's lacquer coating.

A bearing arrangement for a vehicle chassis spring is known from DE 10 2008 046 939 A1. It is recommended that the spring insert on the spring be vulcanized immediately. Doing so would avoid the formation of a gap between the spring coil and the spring insert, but a vulcanization of an elastomer on the spring is work intensive and limits the possible type of material used for the spring insert. For this purpose, it is especially recommended to provide a spring insert for mounting on the spring that is in a state of being not completely vulcanized. The material of the spring insert should only be completely vulcanized once the spring insert is in its final condition, when the spring insert is vulcanized upon the spring. In addition, a primer coat is necessary to be applied to the spring coil upon which the spring insert will be vulcanized, further increasing the vulcanization effort of the spring insert upon the spring coil.

A bearing arrangement for a spring is known from DE 10 2007 003 782 A1 that can be used for a vehicle chassis with a spring insert, which is vulcanized upon the spring wire over the spring coil section. On the one hand, it is indicated that due to the material bonded joint between the helical spring and the spring insert a metallic contact between the spring and a spring plate cannot occur, on the other hand, it is indicated that due to the vulcanization of the spring insert it is prevented that an opening and closing gap between the lower end coil and the recess of the spring insert occurs because all movements of the helical spring end coil are followed by the vulcanized support. Unfortunately, the process of vulcanization of the spring insert onto the spring wire is not adequately integrable in a mounting process.

BRIEF SUMMARY OF THE INVENTION

Hence, it is the objective of the present invention to create a spring bearing arrangement for a spring that overcomes the disadvantages of the above-identified prior art, to provide a simple arrangement of a spring insert to the spring, whereas the process of arrangement, in particular in a mounting process for building a bearing arrangement should be integrable without time lag.

This object is achieved on the basis of a spring bearing arrangement as claimed. Advantageous embodiments of the invention are specified in the dependent claims.

The invention comprises the technical teaching that an adhesive is applied between the spring and the spring insert, with the result that the connection of the spring insert to the spring features a glued connection.

The idea of forming a bearing arrangement according to the invention is to create a material bonded joint between the spring and the spring insert, which can be easily manufactured and incorporated without adding additional time to the bearing arrangement mounting process. Simply applying an adhesive to the spring and/or the spring insert ensues an extremely simple process for creating a bonded joint between the spring and the spring insert without having to select special material for creating a material bonded joint and without the need for costly manufacturing intermediate steps. Preferably, the adhesive can be applied to the spring insert before it is assembled upon the spring. Alternatively or additionally, the adhesive can be applied directly upon the spring.

Therefore, the spring insert comprises an elastomer and is flexibly designed, while the spring support is designed to be movable with a moving of the spring coil. As such, the spring insert can be constructed of a stable but elastically deformable plastic material and the spring characteristic curve is not affected by the compound of the spring insert with the end-side of the spring coil. Due to the co-movement of the spring insert with the spring coil, the spring rolling movement no longer occurs at the point of contact with the spring insert or the spring plate, and the rolling movement is preferably realized between the spring insert and the spring plate.

With particular advantage, an adhesive hardening at room temperature can be applied. This creates the additional advantage that the adhesive joint between the spring and the spring insert does not have to undergo any further processes in order to complete the adhesive joint. Once the adhesive is applied between the spring and the spring insert, the compound generated of the spring and the spring insert can be processed to build a spring system, for example, of a spring strut of a vehicle chassis. The adhesive hardening at room temperature can take place during the mounting process or prior to the completion of the spring system for the vehicle chassis.

The spring features a first end preferably facing the lower end of the vehicle axle, and a second end preferably facing the spring dome upper end, whereas the spring insert arrangement is provided at least on the first and/or second end of the spring. The spring insert arrangement on the spring with the adhesive joint is preferably realized at the first end, pointing toward the vehicle axle lower end of the spring, because on that end there is the most effect on impurities upon the bearing arrangement. In particular the bearing arrangement with a spring plate can collect sand and dust-like contaminants, which may cause an abrasive effect on the spring when spring and spring insert are not material bonded. However, the above-mentioned advantages of the adhesive joint between the spring insert and the spring can also be applied at the second end, preferably pointing toward the spring dome of the upper end of the spring.

The spring insert can be formed ring like and can be extended over an angle of at least 180°, preferably of at least 270° and in particular up to 360° or more. If the angle is less than 360°, then the spring insert is designed in the manner of an open ring, and features, for example, with an angle of 180° the shape of a crescent. If the spring insert extends around a central axis with an angle of example of 360°, this may be realized as a slotted ring. Thereby, a first end area of the spring insert rests on the spring plate, and a second end area of the spring insert is moved also with the spring coil of the spring.

Advantageously, the spring insert features a rectangular base cross-section that is realized constantly, in particular over the annular circumference. The rectangular base cross-section can be embodied with a circumferential recess, in which the recess, in particular features a semi-circular base cross-section. The spring coil can be glued in the semi-circular base cross-section, whereas the rectangular base cross-section of the spring insert can extend itself to at least half of the spring insert.

Furthermore, the bearing arrangement can include at least one spring plate, in which preferably the first spring end is received wherein the spring insert, in particular is arranged between the end-side spring coil and a contact surface of the spring plate. Due to the rectangular base cross-section of the spring insert, the spring insert can feature a bottom surface allowing the spring insert to roll over the spring plate contact surface when the spring is compressed. Alternatively, the base cross-section of the spring insert can be designed variable over the annular circumference, and the spring insert can, for example, have a plane surface over the entire circumference of the spring insert seated on the spring plate. The upper side can, for example, have a circumferential recess with an inclination corresponding to the inclination of the spring coil. With a spring deflection and thus with the movement of the spring coil over the spring plate a compression of the spring insert can occur, so that neither between the spring coil and the spring insert nor between the spring insert and the spring plate a relative movement, in particular a rolling movement could take place.

The bearing arrangement can be part of a suspension system, in particular of a suspension strut of a vehicle chassis in which the helical compression spring is preformed. In particular, a shock absorber can be passed through the helical compression spring, which is arranged concentrically or eccentrically to the rotational axis of the helical compression spring. In particular, the spring plate can be joined to the shock absorber, and the helical compression spring can be supported by the lower end-side against the spring plate and by the upper side against a corresponding mounting arrangement.

If the spring is mounted in the suspension system of a vehicle chassis, a compressive pre-stressing can be introduced in the spring, wherein the adhesive is hardening under the effect of compressive pre-stressing. Thus, a particular advantage is achieved and the adhesive hardening between the spring and the spring insert does not require a separate process step for the adhesive hardening and the compound of spring and spring insert can be processed further, even if the adhesive is already applied in the joint, but it is not yet hardened. The hardening is particularly advantageous under the compressive pre-stressing of the spring in the spring system, during which pressure is applied easily between the joint for creating a resistant adhesive joint. Alternatively, the compound of the spring and spring system can harden without compressive pre-stressing, for example in an appropriate device.

The object of the present invention is further achieved by a method for forming a bearing arrangement for a spring, in particular for a spring of a vehicle chassis, with at least a spring insert in which at least a part of a spring coil of the spring is received, whereas the spring insert comprises an elastomer and that is designed flexible, whereas the spring insert is designed to be movable with a moving of a spring coil, wherein the method comprises at least the steps of arranging of an adhesive between the spring and the spring insert, mounting of the spring insert to the spring and hardening the adhesive. After mounting the spring insert to the spring, a spring pre-load can be applied in the spring, so that the adhesive hardening occurs under the spring pre-load.

With the process according to the invention a bearing arrangement can be provided for a spring, in particular for a spring of a vehicle chassis, wherein an adhesive is applied between the spring and spring insert so that the joint between the insert and the spring features an adhesive joint. The particular advantage of the method according to the invention is that the adhesive can harden under the applied spring pre-load, and the hardening of the adhesive does not require a separate manufacturing step.

In particular, prior to the adhesive application on the spring insert, the contact surface of the spring insert upon which the adhesive will be applied can be activated. Preferably, the surface can be activated in the peripheral recess of the spring insert, in which the spring coil of the spring is glued. Alternatively or additionally, the surface of the spring coil can be activated in order to achieve a better adhesive strength on the spring coil surface. Preferably, the activation can take place at room temperature, so that no auxiliaries must be provided to heat the adhesive joint of its production.

The spring of the bearing arrangement can be designed as a helical compression spring and can be axially pre-loaded to form a strut of a vehicle chassis with a compressive pre-stressing, where the adhesive is hardened under the effect of compressive pre-stressing.

BRIEF DESCRIPTION OF THE SEVERAL VIEWS OF THE DRAWING

Additional measures improving the invention are shown in detail below, together with the description of preferred embodiments of the invention with reference to the figures. The example shows.

DESCRIPTION OF THE INVENTION

Figure 1:
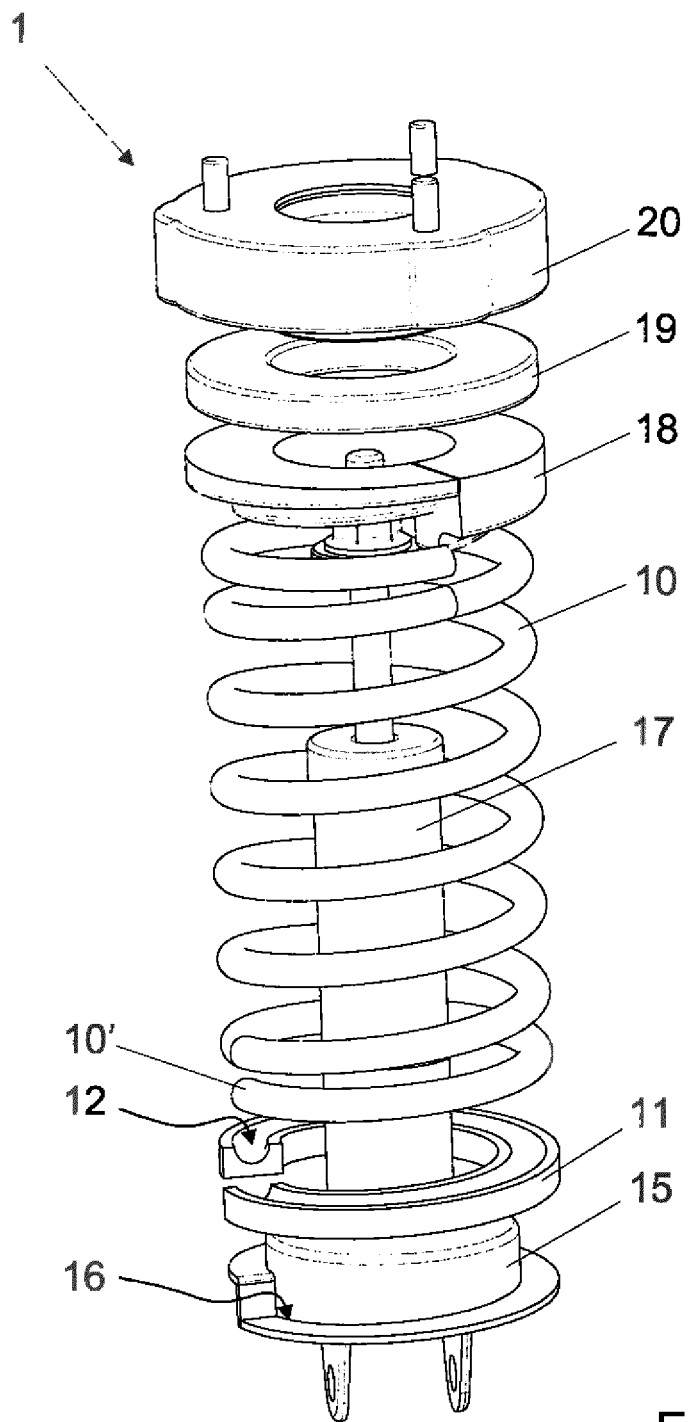
FIG. 1 an embodiment of a bearing arrangement for a spring in perspective view before attaching the spring insert to the spring, FIG. 2 a view of a spring with a spring joined to the spring insert with a joint according to the present invention, FIG. 3 a perspective view of a spring insert to form a bearing arrangement for a spring and FIG. 4 a base cross-section view of the base of a spring insert according to FIG. 3.

In FIG. 1, a bearing arrangement 1 of a spring 10 is shown. The spring 10 forms, together with a shock absorber 17 that is passed through the spring 10, the spring-damper unit of a spring strut for a vehicle chassis. The spring 10 shows a first end, facing a vehicle axis lower end, and a second end facing a spring dome upper end, whereas the spring insert arrangement 11 is exemplified in the first, lower end of the spring 10.

The spring insert 11 is shown in an unmounted state, and it can be adhered for mounting on a part of the spring coil 10' of the spring 10. The spring insert 11 extends itself around the center axis of the spring 10 at an angle of about 360°, so that the spring insert 11 is designed as a slotted ring.

The spring 10 is supported by the spring insert 11 on a spring plate 15, and the spring plate 15 has a contact surface 16, upon which the spring insert 11 can rest. If the spring 10 is clamped in compound with a spring strut, the spring 10 is supported by the spring insert 11 against the contact surface 16 of the spring plate 15. The spring plate 15 is therefore arranged on the lower end of the shock absorber 17.

To create with an adhesive a material bonded joint between the spring 10 and the spring insert 11 according to the present invention, the adhesive 12 is applied, for example, to the joint side of the spring insert 11. If the spring coil 10' is brought into contact with the spring insert 11, the adhesive 12 can be hardened and the spring insert 11 features a material bonded joint with the spring coil 10' of the spring 10.

On the second, upper end of the spring 10, pointing in the direction of a dome spring, the spring 10 is supported against another spring plate 18. The spring plate 18 can build with an elastic element 19, performed for example as a rubber buffer, and an upper mounting arrangement 20 a spring pack arrangement, to be installed in the spring housing vehicle. The upper mounting arrangement 20 may include a top dome mount, to permit the rotation of the strut with the spring 10 and the shock absorber 17. The arrangement shown is commonly used for a front axle of a motor vehicle, in which the bearing arrangement 1 according to this invention can be used for an adhesive joint between the spring 10 and the spring attachment 11 and also for spring seat 10 for the rear axle of a motor vehicle.

Figure 2:
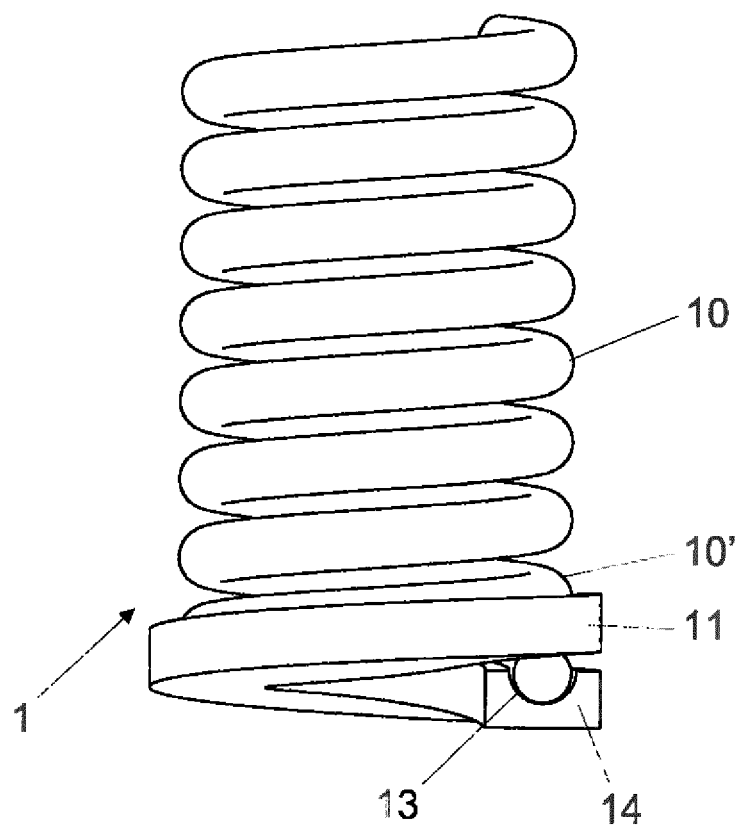

In FIG. 2, the bearing arrangement 1 with a joint between spring 10 and spring insert 11 according to the present invention is explained in detail. The spring insert 11 is shown in an arrangement joining the spring coil 10'. The spring insert 11 extends itself with an angle of 360° around the central axis of the spring 10 and builds a slotted ring. Due to the material bonded joint between the spring insert 11 and the spring coil 10', the spring insert 11 features an inclination which corresponds to the inclination of the spring coil 10'. In operation of the spring coil 10' the spring insert 11 can be moved also with the spring coil 10', and a rolling movement can take place between the spring insert 11 and the spring plate 15 (see also FIG. 1), whereas between the spring coil 10' and the spring insert 11 is no relative movement of the spring enclosure 11.

The base cross-section of the spring insert 11 features a base-section 14, which is constant and unalterable over the annular circumference of the spring insert 11. The rectangular base cross-section 14 is further realized by a circumferential recess 13, in which the spring coil 10' is glued. The recess 13 is shown as a recess with a semi-circular cross-section, so that the spring coil 10' is achieved slightly in the middle of the recess 13 of the spring insert 11.

Figure 3:
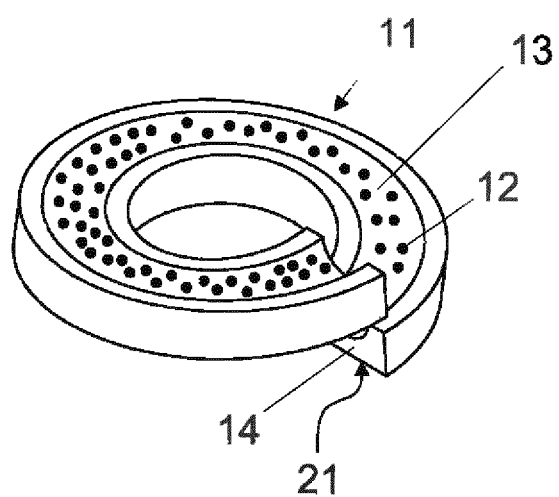

FIG. 3 shows a perspective view of the spring insert 11, which extends itself at an angle of approximately 300° around a central spring axis, which is not shown in detail. The spring insert 11 has a cross base-section 14 that features on the upper side, pointing toward the spring side 10, a circumferential recess 13. On the opposite-pointing downward side, the spring insert 11 has an area 21 that is designed plain and serves as a support surface against the contact surface 16 of the spring plates 15, see FIG. 1.

In the circumferential recess 13 by way of example, an adhesive 12 is applied, which is formed as an adhesive 12 hardening at room temperature. If the spring insert 11 with the applied adhesive 12 with the spring coil 10' of the spring 10 is brought into contact, the material bonded joint between the spring 10 and spring insert 11 can be made to the present invention.

Figure 4:
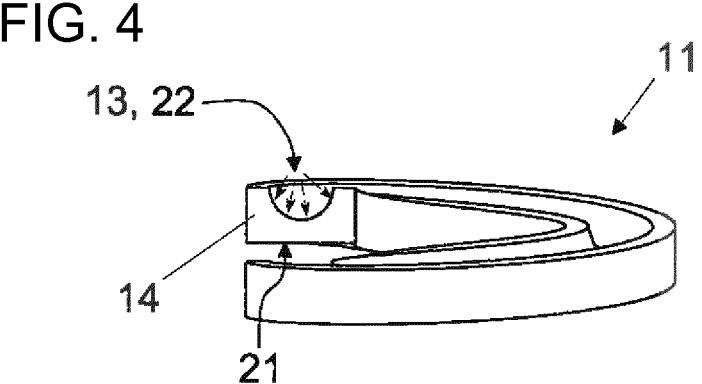

FIG. 4 shows a further view of the spring insert 11 with the base cross-section 14, with the circumferential recess 13 placed on the top side and the area 21 on the lower side. The surface of the spring insert 11 in the circumferential recess 13 can build an activation area 22, which is indicated by several arrows.

The invention is not limited in its design to the preferred embodiments described above. Rather, a number of variations are possible, which make use of the solution presented even by generally different designs. All features and/or advantages resulting from these claims, description, or drawings, including design details, spatial arrangements, and method steps, can alone or in different combinations be substantial to the invention.

LIST OF REFERENCE NUMBERS

1 bearing arrangement
10 spring
10' spring coil
11 spring insert
12 adhesive
13 circumferential recess
14 base cross-section
15 spring plate
16 contact surface
17 shock absorber
18 spring plate
19 elastic element
20 top mounting arrangement
21 area
22 activation area

The invention claimed is:

1. A bearing arrangement for a spring, the bearing arrangement comprising:
    at least one spring insert accommodating therein at least part of a spring coil of the spring;
    said at least one spring insert being formed of an elastomer, being flexible and configured to be movable together with a movement of the spring coil;
    an amount of adhesive applied between the spring and said at least one spring insert to form a glued connection between said at least one spring insert and the spring, said adhesive being an adhesive hardening at room temperature;
    wherein the bearing arrangement is configured to form a part of a spring system that is a suspension strut system of a vehicle chassis, the spring is a helical compression spring, and a shock absorber is disposed within the spring; and
    wherein said spring is prestressed in compression within said spring system, and said adhesive has been hardened under the effect of the compression prestress.

2. The bearing arrangement according to claim 1, wherein the spring is a spring of a vehicle chassis.

3. The bearing arrangement according to claim 1, wherein the spring has a first end and a second end, and said at least one spring insert is provided on at least one or both of said first or second ends of the spring.

4. The bearing arrangement according to claim 1, wherein said first end of the spring is a lower end facing toward a vehicle axle, and said second end of the spring is an upper end facing toward a spring dome.

5. The bearing arrangement according to claim 1, wherein said at least one spring insert is ring-shaped and extends over an arc of at least 180°.

6. The bearing arrangement according to claim 5, wherein said at least one spring insert is a partial ring extending over an arc of at least 270°.

7. The bearing arrangement according to claim 5, wherein said at least one spring insert is a ring which extends over 360°.

8. The bearing arrangement according to claim 5, wherein said at least one spring insert is formed with a substantially rectangular base cross-section.

9. The bearing arrangement according to claim 8, wherein said substantially rectangular base cross-section is formed constantly over an annular extent of said at least one spring insert.

10. The bearing arrangement according to claim 8, wherein said base cross-section includes a circumferential recess, in which the spring coil is glued, the recess being formed substantially with a semi-circular cross-section.

11. The bearing arrangement according to claim 1, which comprises at least one spring plate configured to receive therein an end of the spring, and wherein said at least one spring insert is arranged between an end-side spring coil and a contact surface of said spring plate.

12. A method of forming a bearing arrangement for a spring, comprising:
   providing at least one flexible spring insert formed of elastomer;
   placing an adhesive between the spring and the at least one spring insert;
   mounting the spring insert to the spring by placing at least a part of a spring coil of the spring in the spring insert; and
   after mounting the spring insert to the spring, applying a spring prestress to the spring and then hardening the adhesive under the spring pre-stressing;
   to thereby form the bearing arrangement wherein the spring insert is movable with a movement of the spring coil;
   wherein the spring is a helical compression spring and is axially pre-stressed with a compressive pre-stressing to form a strut of a vehicle chassis, and wherein the adhesive is hardened under the effect of compressive pre-stressing.

13. The method according to claim 12, wherein the bearing arrangement is for a spring of a vehicle chassis.

14. The method according to claim 12, which comprises, prior to arranging the adhesive on the spring insert, activating a contact surface of the spring insert upon which the adhesive is to be applied.

15. The method according to claim 12, which comprises: providing the adhesive as an adhesive which hardens at room temperature and performing the step of hardening the adhesive under the spring pre-stressing at room temperature.

16. The method according to claim 12, wherein the bearing arrangement is configured to form a part of a spring system that is a suspension strut system of a vehicle chassis, the spring is a helical compression spring, and a shock absorber is disposed within the spring.

* * * * *